Oct. 11, 1966
I. N. NIKIFOROV
3,277,528
ELASTIC MELT EXTRUDER WITH INTERNAL
PRESSURE GENERATING SECTION
Filed May 8, 1964
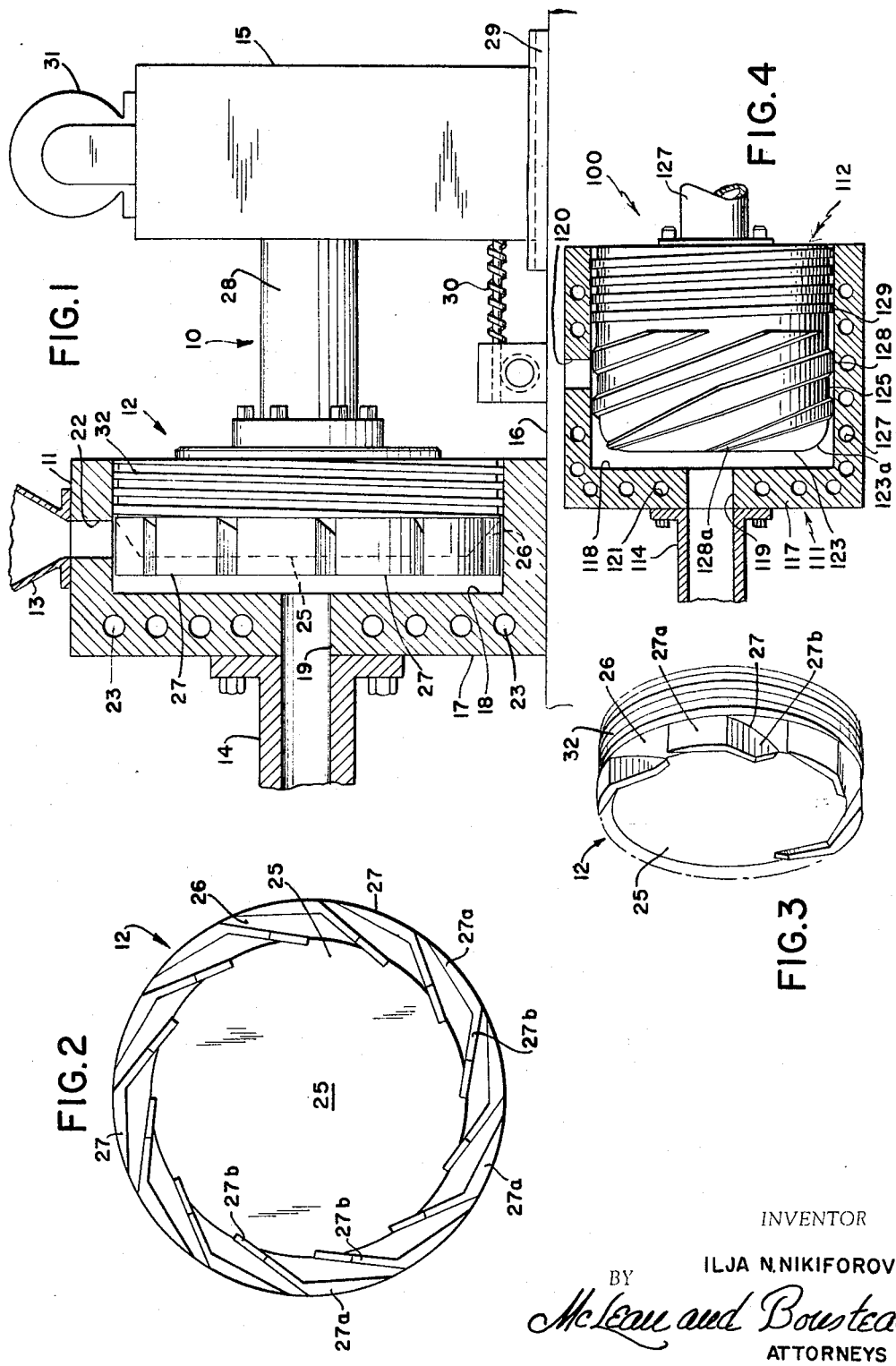
INVENTOR
ILJA N. NIKIFOROV
BY
McLean and Boustead
ATTORNEYS

3,277,528
ELASTIC MELT EXTRUDER WITH INTERNAL PRESSURE GENERATING SECTION

Ilja N. Nikiforov, Livingston, N.J., assignor to KPT Mfg. Co., Roseland, N.J., a corporation of Delaware
Filed May 8, 1964, Ser. No. 365,872
3 Claims. (Cl. 18—12)

This invention relates to elastic melt extrusion and in particular provides a method and apparatus for mixing, plasticating, and extruding or otherwise shaping materials, such as thermoplastic thermosetting resins and elastomers and the like which can be plasticated by mechanical working, at times with the addition of heat, to render them visco-elastic in which state they can be shaped to a desired form through application of pressure, as by extrusion or molding, and from which visco-elastic state they can be subsequently solidified retaining such form.

Elastic melt extrusion, as hereinafter employed, is intended to refer to the plasticating of such materials to render them visco-elastic and to the subsequent discharge of such plasticated visco-elastic materials which are effected by subjecting such materials to torsional shear, that is, shear between closely spaced confronting surfaces which are rotated one relative to the other about an axis which is at an angle to such surfaces. When certain materials, such as resins and elastomers, are thus introduced between closely spaced relatively rotating surfaces, such materials are rapidly plasticated by the shear imposed upon them and are efficiently blended and transformed into a homogeneous visco-elastic state. At the same time, the torsional shear imposed upon them when plasticated and visco-elastic exhibits a secondary effect sometimes known as the "Weissenberg effect" (Nature, 159, 310–311 [1947]). This effect is demonstrable as a force normal to the direction of shear tending to cause flow of the visco-elastic material toward the axis of rotation of the rotating surfaces.

In elastic melt extrusion the device, i.e., elastic melt extruder, in which the materials are plasticated is provided with a discharge orifice in one of the two surfaces between which such materials are subjected to torsional shear. Such orifice is located relatively close to or coincident with the axis of rotation, such that the force created by the Weissenberg effect causes the materials rendered visco-elastic in the device to be discharged, i.e. extruded, through the discharge orifice.

It is generally an overall object of this invention to provide elastic melt extrusion methods and apparatus of the elastic melt type which will generally permit utilizing the advantage of the highly efficient plasticating action of such extruders and extrusion methods while obviating problems heretofore experienced utilizing such extruders and methods.

Thus while it has been found that the simple employment of relatively rotating bodies in an elastic melt extruder which produces the Weissenberg effect in visco-elastic materials is highly suitable for plasticating such materials, the discharge pressures developed by the Weissenberg effect are generally inadequate for direct extrusion of the plasticated material from the apparatus employed.

In addition considerable problems have been experienced in feeding charge materials to elastic melt extruders. While gravity feed of the charge to a location adjacent the peripheries of the confronting surfaces of the elastic melt extruder is often desirable, such a feed can be accomplished in practice only at extremely slow rates and consequently it has usually been found necessary to force feed charge materials which are to be plasticated in an elastic melt extruder. Moreover, such forced feeds, typically screw conveyors, have generally been characterized by a tendency of the charge material, as it melts or otherwise becomes fluent during initial stages of plastication, to gum and clog the feeding apertures and to work backwardly through the seals at the periphery of the confronting surfaces of the extruder and similarly to clog these.

It is a principal object of this invention to provide an elastic melt extruder capable of accommodating gravity or forced feed of pulverant material through an aperture between or adjacent to the peripheries of the relatively rotating confronting working surfaces of the extruder in a manner preventing clogging of the feed material in the vicinity of the feed aperture and permitting attainment of relatively high rates of feed. It is also a principal object of this invention to provide an elastic melt extruder which, even though a gravity feed be employed, will develop pressures on the inlet side of the extruder sufficient to permit discharge of the plasticated material at pressures sufficient to permit extrusion directly through an extrusion die.

In accordance with this invention an elastic melt extruder is provided, as suggested above, in which the marginal portion of one of the confronting working surfaces is provided with a series of impellors disposed at arcuate intervals about the plate or other body on which such working surface is formed. The surfaces of such impellors facing the confronting working surface of the extruder opposite that to which they are attached are spaced from such opposite working surface, and the surfaces on the sides of the impellors form passageways between the impellors which are canted, generally in the same direction and at an angle such that upon relative rotation of the confronting working surfaces in the appropriate direction material between the impellors is forced inwardly into the central space between the confronting working surfaces by reason of sweeping action of the impellors cooperating with the confronting working surface opposite that to which they are attached, as well as by the Weissenberg effect which is set up between the surfaces of the impellors facing such opposite confronting surface.

Generally the charge material is fed to the impellors at the periphery of the space between the confronting working surfaces of the extruder. This can be accomplished by forced or gravity feed through an aperture at such periphery or, in accordance with copending Marcus et al. application Ser. No. 365,873, filed May 8, 1964, entitled Elastic Melt Extruder Having Internal Feed Conveyor, the extruder can have a built-in rotary conveyor which carries the feed to the pressure generating section of the present invention and which is integrally formed therewith.

Since the feed charge presented to the periphery of the confronting working surfaces of the extruder is normally not fluent, but melts or otherwise softens and becomes fluent between the confronting working surfaces by reason of the high shearing action between the confronting working surfaces, as well as by the possible addition of externally supplied heat, the feed material charged peripherally between the impellors, particularly as it approaches the inner ends of the impellors tends to melt or soften and agglomerate forming bridges impeding the impelling action. To obviate this in accordance with this invention the lateral spacing between the confronting side faces of each adjacent pair of impellors increase toward the inner ends of the impellors.

Thus in the elastic melt extruder of this invention charge material fed to the periphery of the space between the confronting relatively rotating working surfaces is impelled initially between impellors toward the center of the space between the working surfaces such that substantial pressure on the inlet side of the extruder is developed which, when aided by the Weissenberg effect developed in the extruder, permits extrusion of plasticated material from the discharge orifice at pressures suitable for extrusion.

For a more complete understanding of the practical application of this invention reference is made to the appended drawings in which:

FIGURE 1 is an elevation shown partly in section of an elastic melt extruder in accordance with this invention;

FIGURE 2 is an end view of a portion of the apparatus shown in FIGURE 1;

FIGURE 3 is an isometric view of the same portion of the apparatus shown in FIGURE 2; and FIGURE 4 is a fragmentary elevation shown partly in section of another elastic melt extruder in accordance with the present invention.

Referring to FIGURES 1–3 of the drawings, the reference number 10 indicates an elastic melt extruder constructed in accordance with this invention. Referring more specifically to FIGURE 1 extruder 10 generally includes a stator 11, a rotor 12 (which is also shown in FIGURES 2 and 3) a gravity feed hopper 13, an extrusion die 14 and a drive mechanism 15.

Stator 11, which is of generally cylindrical shape, is mounted on a platform 16 with its cylindrical axis generally aligned in horizontal position. Stator 11, which is hollow, is closed at one end, as indicated by the reference number 17, while its opposite, open end receives rotor 12. The inside flat wall surface 18 of closed end 17 of stator 11 defines one of the working surfaces of extruder 10 and is centrally apertured, as indicated by the reference number 19, to provide a discharge orifice leading to die 14 which is a conventional extrusion die mounted on a cylindrical sleeve bolted on end 17 of stator 11 to communicate with the interior of stator 11 through discharge orifice 19.

Gravity feed hopper 13 is bolted to the top position of the sidewall of stator 11, and communicates with a feed aperture 22 in the sidewall of stator 11 adjacent the periphery of inside 18 of end wall 17.

End wall 17 of stator 11 is interiorly bored to provide a series of interconnecting passages 23 which can be externally connected to permit circulation of a fluid heat transfer medium through end wall 17 of the purpose of adding or removing heat to such wall.

Rotor 12 is of generally cylindrical construction and fits with its cylindrical sidewall slidably received within the inside sidewall of stator 11 to permit rotation of rotor 12 on an axis coincident with that of stator 11. The end surface of rotor 12 facing inner end wall 18 of stator 11 and designated by the reference number 25 is generally flat and constitutes a working surface confronting working surface 18 with which it forms basic elastic melt extrusion chamber.

Peripherally face 25 of rotor 12 is provided with a slight taper, indicated by the reference number 26, and carries twelve impellor blades 27 disposed at equal arcuate intervals about rotor 12. Note that in FIGURE 3 in order better to show the shape of blades 27 a fewer number of blades than twelve are illustrated.

Each blade 27 includes an outer portion 27a and a continuing inner portion 27b. Each outer portion 27a generally has the shape of a thin wedged-like fin whose outer wall is a continuation of the cylindrical sidewall of rotor 12 and whose inner wall extends from a line coincident with the sidewall in a chordal plane slightly inward of the outer contour of rotor 12 to which a position at which the inner wall of outer portion 27a intersects the inner-wall of inner portion 27b of impellor blade 27.

Inner portion 27b of each blade 27 is a generally flat fin which is canted at an angle with respect to the outer cylindrical surface of rotor 12 from which it extends inwardly across marginal tapered portion 26 onto the flat portion of face 25. It will be noted referring to FIGURE 2, which is a view of end surface 25 of rotor 12, that each portion 27a is approximately the same length as each portion 27b and that, with respect to any pair of adjacent impellor blades 27, the outer face (i.e wall) of portion 27b one confronts the inner face (i.e. wall) of portion 27a of the other defining a channel between such pair of adjacent impellors 27 which leads inwardly from the general cylindrical contour of rotor 12, across tapered marginal portion 26 of face 25. It will be further noted that the angle of cant of the inner face of each portion 27a with respect to a plane tangent to the exterior of rotor 12 at the outer end of portion 27a is less than the similar angle between the outer face of portion 27b with plane tangent at its outer end. Thus the transverse distance between the confronting faces of portions 27b and 27a increases from their confronting outer ends to their confronting inner ends. It wil be further noted that the edge surfaces of portions 27a and 27b all lie in a plane parallel to the flat surface of face 25 slightly extended beyond that face but that portions 27b all taper to face 25 at their inner ends.

Rotor 12 is further provided with a low pitch peripheral thread 32 extending from its end remote from face 25 up to tapered, marginal edge 26 of face 25, which thread when rotor 12 is rotating in its intended manner serves as a seal trapping any material tending to flow backwardly between the sidewalls of rotor 12 and stator 11 in a manner such that loss or accumulation of material between such sidewalls is substantially prevented.

Rotor 12 is mounted on a drive shaft 28 at its end remote from face 25, the other end of drive shaft 28 being connected to drive mechanism 15. Suitably drive mechanism 15 is mounted on a housing disposed on a track 29 for movement parallel to the axis of stator 11, rotor 12 and shaft 28 controlled by a screw mechanism 30 such that the position of rotor 12 relative to face 18 of stator 11 can be adjusted. Drive mechanism 15 suitably includes a drive motor 31 mounted on mechanism 15 to be moved with it and is connected to drive shaft 28 through suitable gearing.

In operation the charge material is permitted to enter the space between surfaces 18 and 25 through aperture 22 which is over such space, while rotor 12 is rotated by drive mechanism 15 in a direction (counterclockwise in FIGURE 2) such that impellor blades 27 tend to scoop material located at the opening of aperture 22 at the periphery of the space between faces 18 and 25 inwardly between them impelling such material onto the flat surface of face 25. The clearance between faces 18 and 25 is adjusted such that a clearance exists also between impellor blades 27 and face 18, hence material entering through feed aperture 22 is swept across face 18 and generally spirals inwardly since a substantial portion of such feed material is gathered in by the impellor blades 27.

It will be noted that material thus gathered inwardly, as it works between impellor blades 27 and face 18 and between the flat portion of face 25 and face 18, is subjected to a torsional shearing which raises the temperature of the material, mixes it and plasticates it. Dependent upon the material and clearances selected and upon the speed of rotation of rotor 12, additional heat may need to be supplied or heat may need to be removed from extruder 10. This can be accomplished by circulating a fluid through passages 23 which is at a temperature suitable to accomplish such result. The fed material as it becomes plasticated is visco-elastic such that it is not only forced inwardly by the sweeping action of blades 27 as it enters the space between faces 18 and 25 but is also subjected to a Weissenberg effect causing the material to be extruded through orifice 19 and die 14.

A problem with such an arrangement as described above occurs as the material charged through aperture 22 is rendered fluent. Since both fluent and non-fluent material are presented at the same time there is a tendency for agglomeration and consequent bridging. This problem is particularly troublesome with granular and other pulverant feed materials, and can prevent impellors 27 from developing any increase in intake pressure. This occurs principally at the location of feed aperture 22 and between impellor blades 27. As relatively nonfluent feed material is gathered by the impellors 27 and first contacts fluent material, the material moves through a space, i.e. between an outer face of a blade portion 27b and an inner face of a blade portion 27a, in which the confronting surfaces are divergent in the direction of flow. Hence any agglomeration which occurs cannot bridge between such diverging surfaces and prevent further flow between such surface.

Referring more particularly to FIGURE 4, another elastic melt extruder 100 in accordance with this invention is shown. Basically extruder 100 is similar to extruder 10 and differs primarily in that it incorporates an internally feed conveyor of the type shown in the above noted Marcus et al. copending application with which an internal pressure generating section according to the present invention has been incorporated. In FIGURE 4, only a stator 111 and rotor 112 have been shown in detail as the remainder of extruder 110 is like extruder 10.

Stator 111, which is of generally cylindrical shape, is mounted in fixed position with its axis generally horizontal. Stator 111, which is hollow, is closed at one end, as indicated by the reference number 117, while its opposite, open end receives rotor 112. The inside flat wall surface 118 of closed end 117 of stator 111 defines one of the working surfaces of extruder 110 and is centrally apertured, as indicated by the reference numeral 119, to provide a discharge orifice leading to a die 114.

A feed hopper, which is a bin having a conical bottom, is mounted on top of stator 111 with its lower, conical end communicating with an inlet aperture 120 extending through the cylindrical sidewall of stator 111.

Stator 111 is further provided with a series of serially communicating passageways 121 disposed in end 117 for interconnection with a source of fluid heat transfer medium while the cylindrical sidewall of stator 111 is provided with a series of interconnected passageways 122 for interconnection with a second source of fluid heat transfer medium.

Rotor 112 is of generally cylindrical construction and fits with its cylindrical sidewall slidably received within the inside of the sidewall of stator 111 to permit rotation of rotor 112 about an axis coincident with that of stator 111. The end surface of rotor 112 facing inner end wall 118 of stator 111, and designated by the reference numeral 123, in generally flat and constitutes a working surface confronting working surface 118 with which it forms the basic elastic melt extrusion chamber.

Rotor 112 exteriorly at its sidewall adjacent face 123 is provided with three overlapping screw flights 128 set at the same, relatively steep pitch, each screw flight making about one turn from a position located about the center of rotor 112 to the end of rotor 112 adjacent face 123. The other end of the sidewall of rotor 112 is provided with a single flight, screw thread 129 making approximately four turns between the center of rotor 112 to its end remote from face 123. It will be noted that the length of screw flights 128 is such that, when rotor 112 is positioned in stator 111 with face 123 of rotor 112 abutting face 118 of stator 111, the ends of threads 128 at the center of rotor 112 just underlie feed aperture 120 in the sidewall of stator 111.

It will be further noted, still referring to FIGURE 4, that the peripheral margin of face 123 of rotor 112 is rounded as indicated at 123a and that the ends 128a of threads 128 adjacent face 123 actually turn partly onto margin 123a. Thread ends 128a are, moreover, tapered as they lead about rounded margin 123a such that the root between them widens as threads 128 thus enter the space between confronting working surfaces 118 and 123.

Such widening of the root thus functions in accordance with the present invention to prevent bridging of charge material between threads 128 as the charge material leaves the conveyor section of extruder 110 which is formed between the sides of stator 111 and rotor 112 and enters the plasticating section between faces 118 and 123 where the charge material is raised in temperature to render it fluent. The tapered ends 128a of threads 128 thus also effectively can impell charge material into the space between faces 118 and 123 while increasing the pressure on such material despite its contact at such point with material previously rendered fluent.

A shaft 127 which is generally cylindrical and hollow is coaxially mounted on the end of rotor 112 remote from face 123 for operative engagement with a drive mechanism.

In accordance with the above noted Marcus et al. application rotor 112 is internally provided with passageways defined to provide for circulation of a fluid heat transfer medium for the purpose of separately controlling the temperature of the sidewall surfaces of rotor 112 and of end wall 123, such that in operation the temperature of charge material in the rotary conveyor section between the sidewalls of rotor 112 and stator 111 can be held below that at which the feed becomes fluent, while the temperature of faces 118 and 123 are more elevated.

Operation of extruder 110 is in all respects like that of extruder 10 except for the manner in which the feed is presented to the internal pressure generating section which, in the case of extruder 110, is formed by the tapered ends 128a of threads 128, as such ends curve about margin 123a and lead into the space between faces 118 and 123.

For more specific consideration of details involving temperature control in elastic melt extruders, reference is made to copending Marcus et al. application Serial No. 365,873, filed May 8, 1964, entitled, Elastic Melt Extruder Having Internal Feed Conveyor and to copending Marcus application Serial No. 365,975, filed May 8, 1964, entitled, Elastic Melt Extruder with Pressured Discharge. The latter application also discusses venting of volatiles which frequently is an important consideration in the use of elastic melt extruders.

I claim:
1. In an elastic melt extruder which includes means defining a first surface, means defining a second surface positioned closely spaced to and confronting said first surface, means for rotating said surfaces one relative to the other about an axis at an angle to said surfaces and about which said surfaces are symmetrically disposed, means for feeding charge material to the periphery of the space between said surfaces, and means in one of said surfaces defining a discharge orifice from the space between said surfaces proximate to said axis of rotation, the improvement which includes a plurality of impellors disposed at arcuate intervals about said axis and affixed to said first surface extending toward and closely spaced from said second surface and leading into said space between said confronting surfaces to define passageways between each adjacent pair of impellors, the lateral spacing between each pair of impellors forming a said passageway increasing inwardly toward the axis of rotation.

2. The improvement according to claim 1 in which said impellors are tapered threads.

3. In an elastic melt extruder which includes means defining a first surface, means defining a second surface positioned closely spaced to and confronting said first surface, means for rotating said surfaces one relative to the other about an axis at an angle to said surfaces and about which said surfaces are symmetrically disposed, means for feeding charge material to the periphery of the space between said surfaces, and means in one of said surfaces defining a discharge orifice from the space between said surfaces proximate to said axis of rotation, the improvement which includes a plurality of impellors disposed at arcuate intervals about said axis and affixed to said first surface extending toward and closely spaced from said second surface, said impellors being canted on said first surface with respect to their direction of rotation with said surface relative to said second surface by said means for rotating said surface, the outer portion of each said impellor including an inner face and the inner portion of each impellor including an outer face, the inner face of such outer portion of each said impellor confronting the outer face of the inner portion of the next adjacent impellor in the said direction of rotation thereby defining a passageway between each adjacent pair of impellors, the lateral spacing of said inner and outer faces forming each said passageway increases inwardly toward the axis of rotation.

References Cited by the Examiner

UNITED STATES PATENTS

| | | | |
|---|---|---|---|
| 3,068,517 | 12/1962 | Blackmore | 18—12 X |
| 3,137,035 | 6/1964 | Hendry | 18—12 |
| 3,153,686 | 10/1964 | Adams | 12—12 X |

WILLIAM J. STEPHENSON, *Primary Examiner.*